United States Patent Office 3,577,477
Patented May 4, 1971

3,577,477
PROCESS FOR CONVERTING SATURATED HYDROCARBONS TO UNSATURATED HYDROCARBONS BY OXIDATION
Pierre Boutry, Port Marly, Jean Claude Daumas, Marly-le-Roi, and Roger Montarnal, Mareil Marly, France, assignors to Institut Francais du Petrole, des Carburants et Lubrifiants, Rueil Malmaison, Hauts-de-Seine, France
No Drawing. Filed Jan. 3, 1969, Ser. No. 788,923
Claims priority, application France, Jan. 10, 1968, 135,566
Int. Cl. C07c 11/22, 5/18, 3/28
U.S. Cl. 260—683.3               15 Claims

ABSTRACT OF THE DISCLOSURE

A process for oxidizing saturated hydrocarbons to olefins and/or dienes, without the substantial formation of oxygen-containing by-products, due to the control of the amount of oxygen used during the oxidation reaction and the selection of particular conditions for manufacturing the catalyst.

---

This invention relates to a new process for oxidizing saturated hydrocarbons containing at least 2 and preferably 4 to 10 carbon atoms per molecule, to the corresponding mono- or poly-olefins. This oxidation is carried out in the presence of a catalyst containing both molybdenum and a metal selected from the group consisting of nickel and cobalt, and in the additional presence of oxygen and at least one gaseous inert diluent such as nitrogen or steam.

According to a preferred embodiment, the invention relates to the oxidation of butane to butene and butadiene.

This process may be carried out continuously and at relatively low temperatures, contrarily to known processes which make use of high temperatures and require repeated regenerations of the catalysts.

Although it was already known to oxidize saturated hydrocarbons to oxygen-containing derivatives by means of the catalysts used in this invention, it is now possible to obtain olefins and dienes from corresponding hydrocarbons, without substantial formation of oxygen-containing by-products, due to a control of the amount of oxygen used during the oxidation reaction and the selection of particular conditions for manufacturing the catalyst (for example selection of the precipitation pH).

The catalyst may be obtained by adding a preferably aqueous solution of a molybdenum salt, acid or oxide to a preferably aqueous solution of a cobalt or nickel salt.

The concentrations of the solutions may vary broadly; however those corresponding to an atomic ratio Ni/Mo or Co/Mo between 0.5 and 1 in the catalyst will be preferred.

Since the efficiency of the catalysts depends on the precipitation conditions such as the type of stirring or the pH which may be advantageously selected between 6 and 7, it is possible to admix the above solutions under strong stirring while controlling the pH by addition of a basic agent such as, for example, an amine in an amount so selected as to provide for a final pH between 6 and 7.

The precipitate is filtered and dried at a temperature between 60 and 200° C., for example.

According to a particular embodiment, it is possible to heat thereafter the catalyst up to a temperature higher than 300° C. and preferably between 400 and 800° C.; this treatment is preferably carried out in the presence of pure or diluted oxygen, at a rate of at least 1% by volume of oxygen in the used gaseous mixture, for a few hours or a few days.

The catalyst may be subjected to any physical treatment such as, for example, crushing, before or after the thermal treatment, in order to be shaped.

The oxidation is carried out in the presence of catalysts such as described above, an inert gas such as, for example, nitrogen or steam, and oxygen preferably in the form of air.

The amount of used oxygen is usually lower than 20% of the total gaseous volume, and preferably between 5 and 10% of this volume, whereas the amount of inert gas may be between 70 and 88% and preferably between 80 and 85% of the total gaseous volume, the remaining percentage corresponding to the hydrocarbons to be oxidized.

According to this invention, the volumetric ratio $O_2$/saturated hydrocarbon is between 0.1 and 2 and preferably between 0.25 and 1.

The reaction temperature is advantageously between 300 and 800° C. and preferably between 400 and 600° C.

The gas feeding rate, expressed as the volume of gas per volume of catalyst and per hour, is between 1,200 and 10,000 and preferably between 1,800 and 7,200 h.$^{-1}$.

The following examples are given for illustrative purposes.

EXAMPLE 1

0.143 mole of ammonium paramolybdate is dissolved in 500 ml. of water at 60° C. and 1 mole of cobalt nitrate hexahydrate is separately dissolved in 125 ml. of water at 60° C. The solutions are admixed and there is added thereto dropwise, under efficient stirring, a monoethanolamine solution, so as to obtain a final pH between 4.5 and 5.5; the obtained precipitate is filtered, dried in an oven at 110° C., crushed and finally heated in open air for 16 hours at 550° C. The atomic ratio Co/Mo in the catalyst is 1; the specific surface of the catalyst is 12.5 m.$^2$/g. and the porous volume 0.5 ml./g.

5 g. of this catalyst are used for treating a mixture of normal butane (10% by volume) with oxygen (2.5% by volume) and nitrogen (87.5% by volume). The reaction temperature is 500° C. and the spatial velocity 7200 h.$^{-1}$ under normal conditions. The following results have been obtained:

conversion:

$$100 \times \frac{\text{moles of oxidized hydrocarbon}}{\text{moles of introduced hydrocarbon}} = 11.6$$

yield of butene (molar): 34.4%
yield of butadiene: 32%

EXAMPLE 2

There are used 5 g. of the catalyst of Example 1. The feed consists of 10% n-$C_4H_{10}$, 10% $O_2$ and 80% $N_2$. Under the operating conditions of Example 1, the following results have been obtained:

conversion: 14.5%
yield of butene: 22.4%
yield of butadiene: 18%

EXAMPLE 3

0.143 mole of ammonium paramolybdate are dissolved in 500 ml. of water at 60° C. and 1 mole of cobalt nitrate hexahydrate are dissolved in 125 ml. of water at 60° C. The two solutions are admixed and a solution of monoethanolamine is added thereto so as to obtain a pH between 6 and 7. The precipitate is filtered, dried in an oven at 110° C., crushed and heated in open air at 550° C. for 16 hours. The atomic ratio Co/Mo in the catalyst is 1; the specific surface of the catalyst is 14.1 m.$^2$/g. and the porous volume 0.76 ml./g.

5 g. of this catalyst are used to oxidize a feed having the following composition by volume: 10% of n-$C_4H_{10}$, 2.5% of $O_2$ and 87.5% of $N_2$. The reaction temperature is 500° C. and the spatial velocity 7,200 h.$^{-1}$. The following results have been obtained:

conversion: 13.3%
yield of butene: 36%
yield of butadiene: 35%

EXAMPLE 4

5 g. of the catalyst of Example 3 are used to oxidize a feed consisting of 10% n–$C_4H_{10}$, 5% $O_2$ and 85% $N_2$ by volume. The reaction temperature is 500° C. and the spatial velocity 3,600 h.$^{-1}$. The following results have been obtained:

conversion 20%
yield of butene: 26%
yield of butadiene: 35%

EXAMPLE 5

5 g. of the catalyst of Example 3 are used to oxidize a feed consisting of 10% n–$C_4H_{10}$, 10% $O_2$ and 80% $N_2$ by volume. The reaction temperature is 500° C. and the spatial velocity 2,400 h.$^{-1}$. The following results have been obtained:

conversion: 27.5%
yield of butene: 17%
yield of butadiene: 30%

EXAMPLE 6

The operating conditions of Example 5 are used with a feed consisting of 10% n–$C_4H_{10}$, 10% $O_2$, 55% $N_2$ and 25% $H_2O$ by volume, at a spatial velocity of 1,800 h.$^{-1}$. The following results have been obtained:

conversion: 25%
yield of butene: 18%
yield of butadiene: 32%

EXAMPLE 7

The conditions are those of Example 5, however with a feed consisting of 10% n–$C_4H_{10}$, 12.5% $O_2$ and 77.5% $N_2$ at a spatial velocity of 1,800 h.$^{-1}$. The following results have been obtained:
conversion: 32.5%
yield of butene: 15.4%
yield of butadiene: 31%

EXAMPLE 8

1 mole of $MoO_3$ is dissolved in 2 moles of ammonia and water is added so as to complete the volume to 2 liters. The resulting solution is heated up to 90° C. 1 mole of cobalt nitrate hexahydride is dissolved in 250 ml. of water and the solution is heated up to 90° C. The 2 solutions are admixed and ammonia is added to bring the pH to 7. The precipitate is filtered and dried at 110° C.; it is then crushed and roasted at 550° C. for 16 hours in the air. The atomic ratio Co/Mo in the catalyst is 1, the specific surface is 14.5 m.$^2$/g. and the total volume 0.74 ml./g.

5 g. of this catalyst are used for treating a feed consisting of 10% n–$C_4H_{10}$, 2.5% $O_2$, 87.5% $N_2$.
The reaction temperature is 500° C. and the spatial velocity 7,200 h.$^{-1}$.

The results are as follows:
conversion: 10%
yield of butene: 40%
yield of butadiene: 36%

We claim:
1. A process for oxidizing saturated hydrocarbons to mono- or polyenes, wherein said hydrocarbons are contacted with a gaseous mixture consisting of oxygen and at least one inert gas at a temperature between 300 and 800° C., said process being carried out in the presence of a catalyst consisting essentially of molybdenum and at least one member selected from the group consisting of nickel and cobalt, the volumetric ratio of oxygen/hydrocarbon being in the range of 0.1 to 2.
2. The process according to claim 1, wherein the volumetric ratio of oxygen/hydrocarbon is in the range of 0.25 to 1.
3. The process according to claim 1, wherein oxygen is used in an amount of 2 to 20% with respect to the total gas volume.
4. The process according to claim 1, wherein the oxygen is supplied by air.
5. The process according to claim 1, wherein the inert gas is nitrogen.
6. The process according to claim 1, wherein the inert gas comprises nitrogen and steam.
7. The process according to claim 1, wherein the reaction temperature is between 400 and 600° C.
8. The process according to claim 1, wherein the catalyst is obtained by admixing a solution of a molybdenum compound with a solution of a nickel or cobalt compound at a pH between 6 and 7.
9. The process according to claim 8, wherein the pH of the solution is adjusted by adding an amine or ammonia thereto.
10. The process according to claim 1 wherein the feed rate expressed as the volume of gas per volume of catalyst, per hour is between 1,200 and 10,000 h.$^{-1}$.
11. The process according to claim 1 wherein the atomic ratio Ni/Mo or Co/Mo in the catalyst is between 0.5 and 1.
12. The process of claim 1, wherein the saturated hydrocarbons contain about 4 to 10 carbon atoms.
13. The process of claim 12, wherein the saturated hydrocarbon is butane and the products are butene and butadiene.
14. The process of claim 1, wherein the oxygen is present in an amount of between 5 to 10% of the total gas volume.
15. The process of claim 1, wherein the inert gas is present in an amount of between 80 and 85%.

References Cited
UNITED STATES PATENTS
3,159,688   12/1964   Jennings et al. _____ 260—680

DELBERT E. GANTZ, Primary Examiner
G. E. SCHMITKONS, Assistant Examiner

U.S. Cl. X.R.
252—470; 260—680E